United States Patent [19]

Kubis

[11] Patent Number: 4,825,538

[45] Date of Patent: May 2, 1989

[54] METHOD AND APPARATUS FOR INSERTING PINS INTO HOLES IN PERFORATE BOARD MEMBERS

[75] Inventor: Leon S. Kubis, West Palm Beach, Fla.

[73] Assignee: Northern Telecom Limited, Montreal, Canada

[21] Appl. No.: 125,153

[22] Filed: Nov. 25, 1987

[51] Int. Cl.[4] .......... H01R 9/28; B23P 19/00

[52] U.S. Cl. .......... 29/845; 29/739; 29/842

[58] Field of Search .......... 29/739, 842, 845

[56] References Cited

U.S. PATENT DOCUMENTS

| | | | |
|---|---|---|---|
| 3,735,466 | 5/1973 | Jensen | 29/739 |
| 3,737,998 | 6/1973 | Byrd | 29/845 |
| 3,768,134 | 10/1973 | Reda et al. | 29/882 X |
| 3,812,569 | 5/1974 | Kufner et al. | 29/739 X |
| 3,924,325 | 12/1975 | Kufner | 29/842 |
| 4,467,523 | 8/1984 | Chisholm | 29/845 |

OTHER PUBLICATIONS

*IBM Tech Disclosure Bull* vol. 22, No. 9 Feb. 1980, pp. 3998-3999 by F. W. Chapin et al.

*Primary Examiner*—Carl J. Arbes

*Attorney, Agent, or Firm*—Foley & Lardner, Schwartz, Jeffery, Schwaab, Mack, Blumenthal & Evans

[57] ABSTRACT

Inserting pins into a printed circuit board by supporting the board on a vertically adjustable platen and adjusting the height of the platen relative to the lower end of pin insertion strokes so as to control the pin height. A downward load is applied to the board to eliminate warpage and the height of each pin above the board is monitored, any variation in monitored height controlling vertical movement of the platen to make any height adjustment necessary.

12 Claims, 4 Drawing Sheets

METHOD AND APPARATUS FOR INSERTING PINS INTO HOLES IN PERFORATE BOARD MEMBERS

This invention relates to the insertion of pins into holes in perforate board members.

Methods and apparatus are known for inserting pins into holes in perforate board members. A printed circuit board is a type of perforate board member which has holes lined with conductive material forming .part of the printed circuit of the board. Pins are inserted into the holes and project from the board for insertion into connector sockets for electrically connecting the printed circuit with electrical equipment. The holes in a printed circuit board are normally arranged in straight and parallel rows. To insert the pins, the printed circuit board is supported in a certain horizontal position and is moved horizontally to transport the holes in a first of the rows along a path aligned with and extending through a pin insertion station, the movement being intermittent to position the holes in turn in the station. After each intermittent step, a punch is operated downwardly to insert a pin in the hole presently in the station. After the pins are inserted into the holes of the first row, the printed circuit board is then moved laterally of the path to move a second row of holes onto the path. The circuit board is then moved to transport the second row of holes through the pin insertion station for pin insertion. This procedure continues until pins have been inserted into all the holes which are required to receive them. The pins are presented to the pin insertion station sequentially from a bandolier of side-by-side and spaced apart pins. The bandolier is moved past the pin insertion station, each pin being moved from the bandolier laterally into the station and beneath the punch for insertion into its corresponding hole.

In the known method and apparatus for pin insertion, the punch operates downwardly on a pin insertion stroke to a fixed lower vertical position with the object of maintaining a constant pin height from the upper surface of the printed circuit board. However, problems arise in that the boards themselves may not be perfectly flat, but each board may be warped in its own individual fashion. As a consequence of board warpage, a board will not be supported in planar condition as it transports its holes through the pin insertion station and during pin insertion. Hence, in a warped board, the tops of the pins may lie substantially in a single plane, but the heights of the pins will vary from the board dependent upon the degree of warpage. Further, when a warped printed circuit board is attached to an electrical connector socket, there is a tendency for the board to straighten out so that the different lengths of pins extend to different distances into their sockets whereby the interfacial connections between the pins and sockets vary in a particular board. Pins may vary in height in a particular board by as much as 0.016 inches.

The present invention seeks to provide an apparatus and method for inserting pins into a perforate board member which will lessen the above disadvantage.

Accordingly, the present invention provides an apparatus for inserting pins into holes in a perforate board member having a nominally planar upper surface comprising: pin insertion means in a pin insertion station for urging the pins downwardly in succession on pin insertion strokes into holes in the board member, the pin insertion means movable downwardly on each pin insertion stroke to a fixed lower vertical position; support means below the pin insertion means for supporting the board member as the board member is transported through the pin insertion station, the support means comprising a platen which is vertically adjustable relative to said fixed lower vertical position, and means for vertically adjusting the platen; pin height control and monitoring means operable:- (1) to press the board member downwardly towards the platen in the vicinity of each specific hole before and during operation of the pin insertion means on a pin insertion stroke in relation to the hole; and (2) for monitoring the projecting height after insertion of each pin above the upper surface of the board member; and control means operable, when the monitoring means monitors a projecting pin height which varies from a desired height, to controllably adjust the vertical position of the vertically adjustable platen and thus of the board member and pin height control and monitoring means in an appropriate direction to render the projecting height of a succeeding inserted pin closer to that desired.

With the apparatus according to the invention, the pin height control and monitoring means in moving downwardly onto the board member and towards the platen, eliminates or substantially eliminates any warpage of the board in the vicinity of a specific hole lying at that instant in the pin insertion station. The elimination of warpage ensures that the upper surface of the board is maintained a certain distance below the fixed lower vertical position of the pin insertion stroke of the pin insertion means. As a consequence, the distance between the upper surface of the board and the upper end of each pin is controlled within certain practical limits whereby the heights of the pins are substantially uniform notwithstanding their insertion into warped boards.

The invention also includes a method of inserting pins into holes in a perforate board member having a nominally planar upper surface comprising:- supporting the board member on a support surface while transporting the member through a pin insertion station; as the board member is transported through the station, inserting pins into the holes in succession in the pin insertion station to positions in which the tops of the pins are in a fixed vertical position; and before and during insertion of each pin:- (i) applying a downward load onto the board member to press it onto the support surface in the vicinity of the corresponding hole to dispose the upper surface of the board member in the vicinity of each hole at substantially equal distances from the fixed vertical position during insertion of each pin; (ii) monitoring the projecting height of certain inserted pins above the board upper surface after their insertion; and (iii) when a monitored height varies from that desired, controllably adjusting the height of the support surface so as to adjust the distance of the board upper surface around a succeeding hole from the fixed vertical position to render the height of a succeeding pin closer to that desired.

One embodiment of the invention will now be described, by way of example, with reference to the accompanying drawings, in which.

Figure 1:
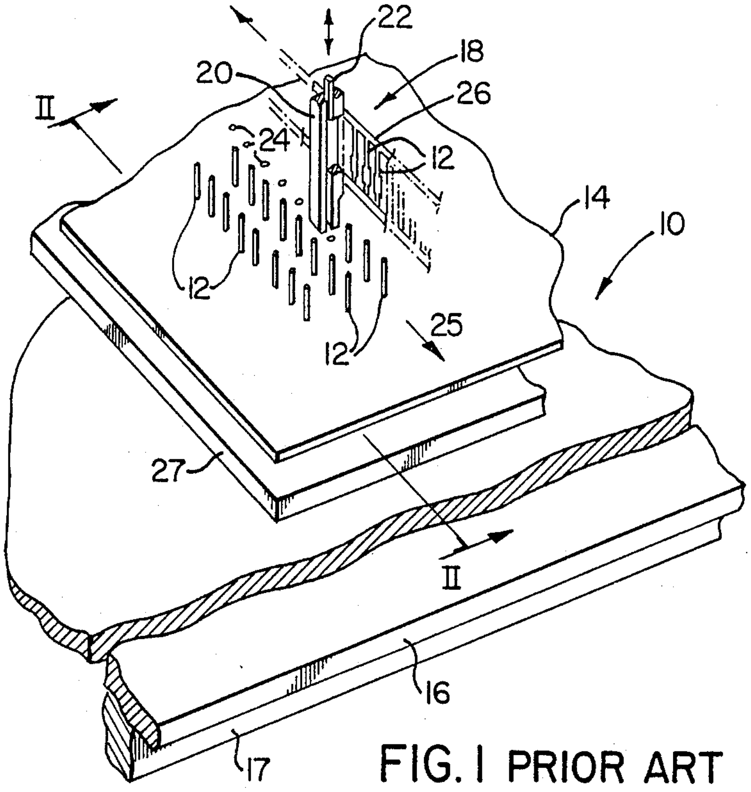
FIG. 1 PRIOR ART
FIG. 1 is an isometric view of the functional parts of a known apparatus for inserting pins into printed circuit boards and showing the apparatus in use.

As shown in FIG. 1, a prior art apparatus 10 for inserting electrically conducting pins 12 into a perforate board member in the form of a printed circuit board 14 comprises a horizontally disposed, immovable platen 16 held by a machine frame 17. Above the platen in a pin insertion station is disposed a pin insertion means 18 which comprises a vertical guide 20 for a punch 22 for urging pins 12 downwardly in succession into holes 24 in the printed circuit board. The pins are provided in known manner for the punching operation from a bandolier 26 of pins which is moved along a feedpath past the pin insertion station. The known apparatus also includes a means for removing the pins 12 in sequence from the bandolier 26 and moving them horizontally into the pin insertion station below the punch 22. A means is provided for moving the printed circuit board across the platen in intermittent fashion to move the holes 24 in each of the rows in which they are disposed, through the pin insertion station. The moving means includes a mother platen 27 which carries the board 14 to align the holes 24 with holes in the platen 27. After insertion of pins 12 into holes 24, lower ends of the pins 12 project downwardly from the board 14 and into the holes in platen 27 with clearance. The platen 27 moves in controlled and intermittent manner across the platen 38 with the board 14 secured to platen 27. The apparatus operates synchronously to align successive holes 24 in the board with the pin insertion station, move the bandolier 26 intermittently past the pin insertion station, and to remove the pins 12 from the bandolier in succession and insert them into the holes in the board. Upon pins having been inserted into a row of holes in the board, the printed circuit board is then moved laterally to align another row of holes with the pin insertion station and this row is then moved in succession through the station for pin insertion by movement of the board in the direction of arrow 25. As the above apparatus and its method of use are known, no further description is necessary.

Figure 2:
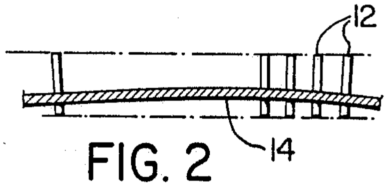
FIG. 2 PRIOR ART
FIG. 2 is a cross-sectional view taken along line II—II in FIG. 1 showing a board with pins inserted by the known method.
Figure 3:
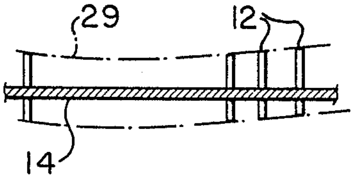
FIG. 3 PRIOR ART
FIG. 3 is a view similar to FIG. 2 showing the board in use with pins inserted.

While the known apparatus is designed for the accurate location of pins in a printed circuit board and it is also intended that the apparatus should position each of the pins at substantially the same height above the upper surface of the board, such is not always the case. It has been found in practice that at least some printed circuit boards are warped and that the warping characteristic is individual for each particular board. Because of the warping effect, which may displace parts of a board by up to 0.007 inches out of the plane of the remainder of the board, the heights of inserted pins into a warped board are caused to vary. This is because the apparatus takes no account of the board warpage, and with the punch operating on a pin insertion stroke to a fixed lower vertical position, then the tops of the pins will be substantially in a single horizontal plane 28 (as shown chain-dotted in FIG. 2) with the board in a warped condition whereby the heights of the pins above the board is caused to vary. FIG. 2 shows warpage exaggerated for purposes of description. The prior apparatus does not compensate for any warpage in the board, but in effect operates on the basis that every board is in a planar and unwarped condition. As a result of the differing heights of the pins in the board 14, when the warped board is flexed to bring it into a substantially planar condition as shown in FIG. 3 (as would occur when the pins are connected into a connector socket) then the top free ends of the pins no longer lie in a single plane. Instead, the ends of the pins will lie along a line, for instance line 29, which is a mirror image of the original warpage. As a result, the interfacial area of engagement with connector sockets differs from pin to pin when the board is in use.

The apparatus of the present embodiment is able to eliminate or significantly reduce the effects of the warpage of printed circuit boards even though this warpage will in fact vary from one board to another. In the embodiment, parts of the same structure and operation as in the prior art discussed above will be referred to by the same reference numerals.

Figure 4:
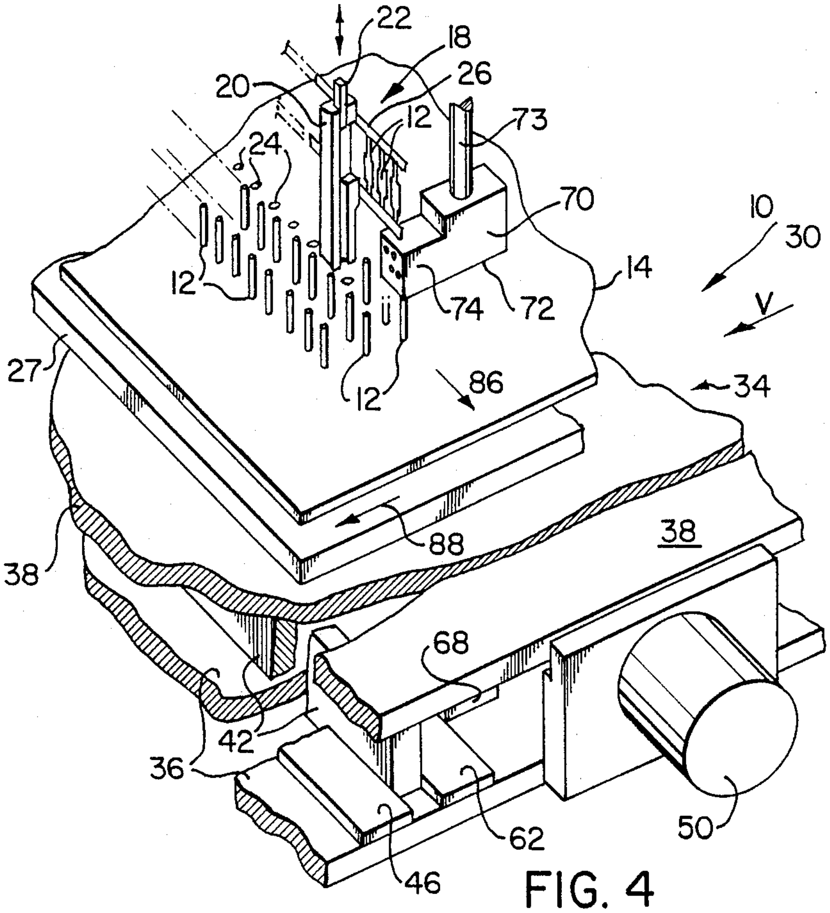
FIG. 4 is a view similar to FIG. 1 of the functional parts of an apparatus according to the embodiment shown during insertion of pins into a printed circuit board.

The apparatus 30 according to the embodiment (FIG. 4) comprises a pin insertion means 18 of similar construction to that of the prior art. This includes a guide 20 and a punch 22 in the pin insertion station for vertical movement on working and return strokes for the insertion of pins 12 into a printed circuit board 14. As in the prior art, a mechanism (not shown) is provided for moving a bandolier 26 of the pins 12 past the pin insertion station. A further mechanism (not shown) is also used as in the prior art for removing pins from the bandolier in sequence and for moving them laterally into the pin insertion station and under punch 22.

Figure 5:
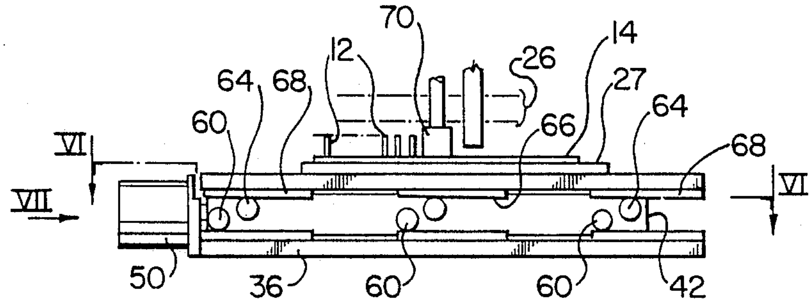
FIG. 5 is a view in the direction of arrow V in FIG. 4 of the apparatus of the embodiment and to a smaller scale.
Figure 6:
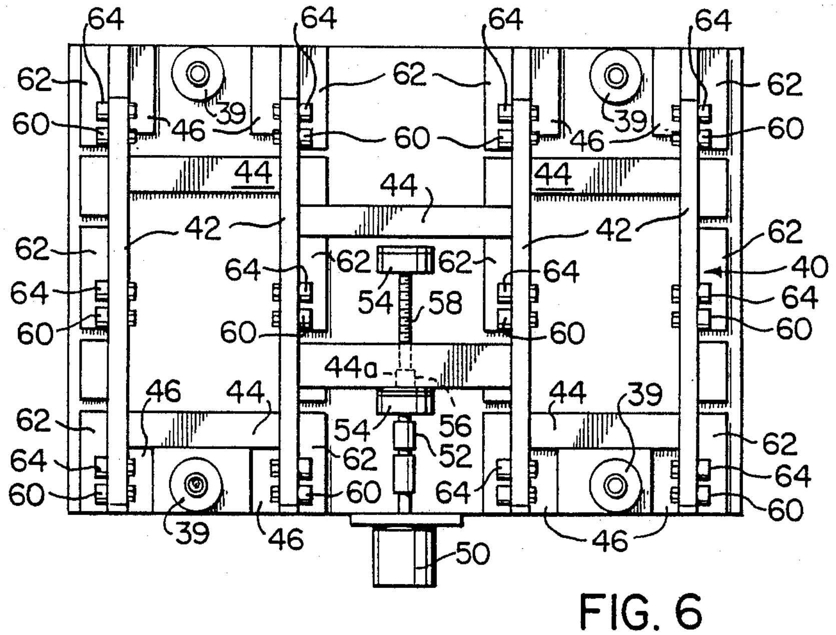
FIG. 6 is a cross-sectional view through the apparatus taken along line VI—VI in FIG. 5.
Figure 7:
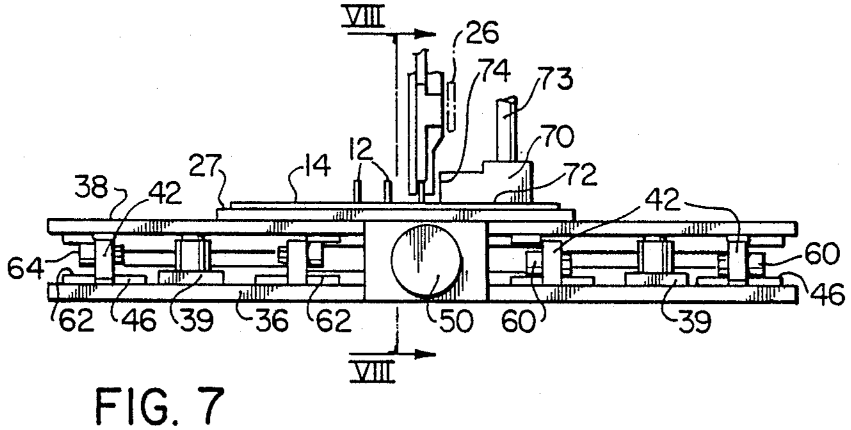
FIG. 7 is a side view of the apparatus taken in the direction of arrow VII in FIG. 5.

A support means 34 for a printed circuit board differs from platen 16 of the prior art and comprises a horizontally and vertically fixed platen 36 and a vertically movable platen 38 which overlies the platen 36. The platen 38 is located in position by four telescoping mountings 39 disposed between the platens and substantially frictionlessly allowing for vertical movement of platen 38. This is shown in FIGS. 5 and 7. Means is provided for vertically adjusting the position of the platen 38 controllably with regard to the fixed lower position of movement of the punch 22 on its working stroke. This adjusting means comprises a horizontally movable element 40 which is disposed between the two platens. As is more clearly shown in FIG. 6, the horizontally movable element 40 comprises a frame structure having four parallel bars 42 held in spaced relationship by metal spacing bars 44 which extend normal to the length of the bars 42. The bars 42 have side surfaces engaged by guide members 46 carried by the upper surface of the platen 36. The frame 40 is thus movable in the longitudinal direction of the bars 42. Frame 40 is controllably movable in a manner to be described, by an electric stepper motor 50 which is mounted upon one end of the platen 36. The motor has a rotatable driven shaft 52 which is received within spaced apart bearings 54 mounted upon the upper surface of the platen 36. Between the bearings 54, the shaft 52 passes through one of the spacer bars 44a and means is provided for translating rotational movement of the shaft 52 into a lateral movement of the bar 44a so as to move the frame 40 alternatively backwards and forwards along its path. The means for creating this movement may be an ordinary screw threaded means. In this case, the shaft is simply screw threaded and is received within a screw threaded hole in the spacer bar. However, in this embodiment the screw threaded means comprises a ball nut 56 held within the spacer bar and in engagement with ball screw 58 which forms part of the shaft 52. The ball nut and ball screw may be of the type sold by Warner Corporation under their Product No. M-505. The frame 40 is supported upon the platen 36 by means of supporting rollers 60 which are rotatably carried at the ends and intermediate the ends of the bars 42. The rollers are engageable with support surfaces provided by metal pads 62 carried upon the platen 36.

The means for vertically adjusting the platen 38 also comprises a means for translating degrees of horizontal movement of the frame 40 into smaller degrees of vertical movement of the platen 38. This movement translating means comprises a group of horizontally spaced apart rollers 64, namely twelve, which are located one adjacent to each of the rollers 60. These rollers 64 have axes positioned slightly higher than the axes of rollers 60 and engage under surfaces 66 of tapered plates 68 which are secured to the undersurface of the platen 38. Because of the tapered nature of the plates 68, the undersurfaces 66 are inclined slightly, each in the same direction and angle, to the horizontal and also provide part of the movement translating means. The angle is such that each surface 66 extends vertically for a distance of 0.031 inches for a horizontal distance of 1.75 inches. Therefore, any horizontal movement of the frame 40 in the appropriate direction is translated into a vertically upward or downward movement of the platen 38 in the ratio of 1.75 to 0.031 inches.

The apparatus of the embodiment also differs from the prior art in that it has a pin height control and monitoring means and a control means which controllably adjusts the vertical position of the platen 38.

The pin height control and monitoring means comprises a pin height monitoring head 70 which is disposed adjacent to the pin insertion station over the platen 38 and is located in a downstream direction along the passline of a printed circuit board during pin insertion. As is more clear from FIGS. 4 and 7, the monitoring head 70 is in the shape of a foot and has a friction reducing undersurface 72 in the form of a polytetrafluoroethylene coating. The head projects towards the passline from a head support in the form of a vertical rod 73 which is automatically loaded to act downwardly towards the platen 38, the front end 74 of the head 70 facing and lying close to the passline. The load which may be applied through the rod 73 is sufficient to cause the monitoring head 70 to press downwardly upon a printed circuit board so as to press it firmly into contact with the mother platen 27 in the vicinity of the pin insertion station and eliminate any warpage in the board in that area during a pin insertion stroke.

Figure 8:
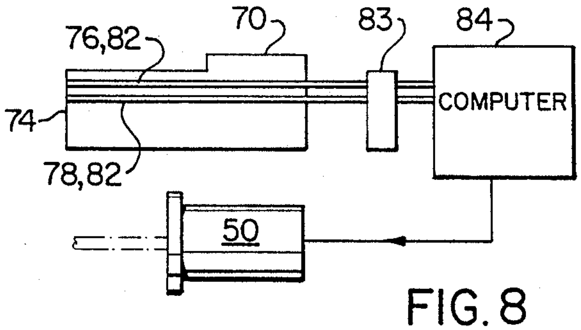
FIG. 8 is a diagrammatic view of parts of the apparatus for monitoring and controlling the height of inserted pins.

The height control and monitoring means also comprises a light source and light detector arrangement which extends into the head for detecting the heights of inserted pins as they move downstream in the printed circuit board from the pin insertion station. The light source and detector arrangement comprises two pairs 76 and 78 of optic fibers (see particularly FIGS. 8 to 12). Each pair of fibers comprises a light transmitting fiber 80 and light receiving fiber 82 which open at the front end 74 of the monitoring head so as to be directed towards the path followed by inserted pins moving away from the pin insertion station. The fibers of each pair are focused upon the path so as to be reflectively coupled together when an inserted pin passes through the focal point. As can be seen from FIGS. 9 to 12, the pair 76 of fibers is slightly higher than the pair 78 and this vertical positioning of the two pairs decides the desired maximum and minimum heights of pins above the printed circuit board. In this apparatus, it has been found that the vertical difference in heights between the two pairs can be controlled within limits of 0.003 inches. When light is reflected down either of the fibers 82, then the light signal is converted into an electrical signal and amplified in amplifier 83 before being sent to the control means which comprises a computer 84 which is operably connected to the stepper motor 50 as shown by FIG. 8.

Figure 9:
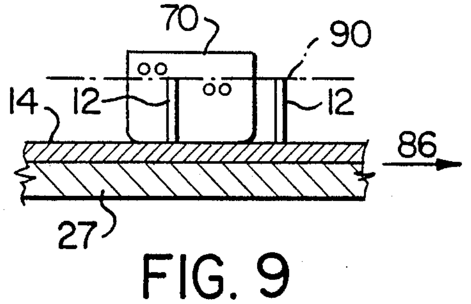
FIGS. 9, 10 and 11 are cross-sectional views taken along section line VIII—VIII in FIG. 7 and showing the operation of part of the apparatus to a much larger scale.
Figure 10:
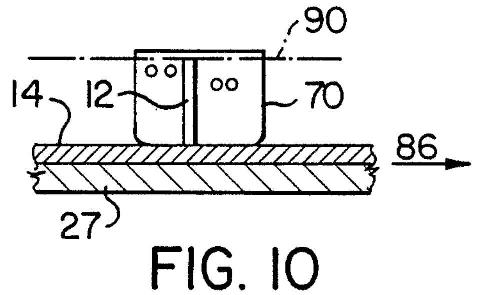
Figure 11:
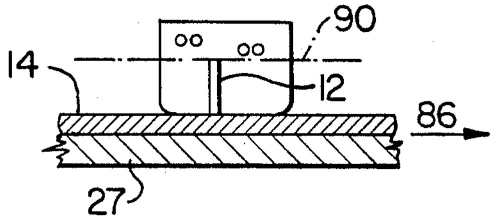
Figure 12:
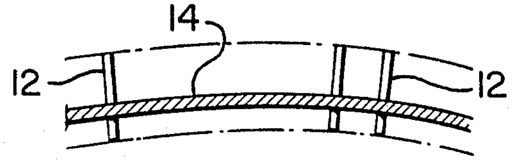
FIG. 12 is a cross-sectional view similar to FIG. 3 of a board inserted with pins with the apparatus according to the embodiment.

It is intended that the stepper motor should be controlled so as to raise the platen 38 towards the fixed lower vertical position of the punch 22 in a case where an inserted pin is monitored as having a height greater than that desired. On the other hand the platen 38 is lowered where an inserted pin is shorter than that desired. This control is dependent upon sampling of signals from the two pairs of fibers for a controlled time period after each pin insertion and before the next succeeding pin insertion. Thus after each pin insertion, and during the next intermittent movement of the printed circuit board to bring the next hole into the pin insertion station, the last inserted pin passes the vertical position for the two pairs of fibers 76 and 78. The sampling of the signals from the fibers is such that if a signal is received in the fiber 82 of the pair 78, but not in that of the pair 76, then the monitored inserted pin is at the desired height, i.e. it lies above the lower pair but below the upper pair of fibers. This is as shown in FIG. 9 where the tops of the pins coincide on horizontal plane 90 which is at the fixed lower vertical position of punch 22. On the other hand, should light pass through both of the fibers 82 this indicates that the inserted pin is too high (FIG. 10). In other words, the platens 27 and 38, the board 14 and the monitoring head 70 are low compared to the plane 90. The motor 50 is then operated to appropriately raise the platen 38. Alternatively, if during the preset time period no light signal is received by either of the fibers 80, this is an indication that the monitored inserted pin is at a height lower than that desired (FIG. 11). The platens 27 and 38, board 14 and head 70 are thus too high to the plane 90. The computer then operates to actuate the stepper motor 50 to lower the platen 38.

In use of the apparatus of the embodiment, a printed circuit board 14 is supported upon the mother platen 27 intermittently movable across the platen 38 and is moved so as to pass the holes 24 in each row through the pin insertion station in controlled manner to enable the pins 12 to be inserted. Thus the board is moved intermittently in direction of arrow 86 (FIG. 4) to insert pins 12 into holes along any particular row. After the pins have been inserted in the required holes in one row then the mother platen and thus the board is moved laterally in the direction of arrow 88 in FIG. 4 to enable the pins to be inserted in the next adjacent row by moving this row also along a path through the pin insertion station. During pin insertion, the board passes beneath the monitoring head 70 and the load applied through the head presses the board onto the mother platen 27 in the vicinity of the pin insertion station. Thus, in the pin insertion station during insertion of any pin, the effects of warpage of the board are substantially avoided whereby the height from the top of the board to the fixed lower vertical position of the punch on the pin insertion stroke remains substantially constant for a fixed vertical position of the platen 38. After each row of pins has been inserted, the lateral movement of the printed circuit board and thus of inserted rows of pins is away from the monitoring head 70 (i.e. in the direction of arrow 88) so that there is no obstruction between the monitoring head and the row of pins which are being inserted at any particular time. After each pin is inserted by the synchronously operating machine, the printed circuit board, in moving to bring the next pin into position, transports an inserted pin horizontally past the two pairs of fibers 76 and 78 which provide the appropriate signals to the computer as discussed above to operate the motor 50.

It should be realized that as the platen 38 is being moved vertically then this movement is accompanied by vertical movement of the monitoring head 70 which is carried upon it under its loading pressure. Thus the head and the optic fibers are moved vertically relative to the fixed lower position of the punch 22 i.e. the plane 90. If the monitoring head indicates that its position is high or low in comparison to the height of any particular pin, i.e. by the pin passing through the focal point of both sets of fibers or through neither set of fibers, as the case may be, then the platen 38 is moved appropriately to raise or lower the printed circuit board and the monitoring head with it. It has been found that the apparatus according to the embodiment provides accurate control of the height of inserted pins in a printed circuit board within extremely narrow limits. The control of the height is not affected by any warpage in the board because this warpage is eliminated by downward pressure of the head 70 for the short period necessary at any particular location during pin insertion in that location. As a result, a warped board which will still be warped after pin insertion will have its inserted pins all within the desired height above the board. This is illustrated in the exaggerated warped board shown in FIG. 11 in which the free ends of the inserted pins lie on a path of curvature which follows that of the warped board itself. Needless to say when the board is flattened into planar condition during use, then the free ends of the pins will lie substantially in a single plane.

What is claimed is:

1. Apparatus for inserting pins into holes in a perforate board member having a nominally planar upper surface comprising:

pin insertion means in a pin insertion station for urging the pins downwardly in succession on pin insertion strokes into holes in the member, the pin insertion means movable downwardly on each pin insertion stroke to a fixed lower vertical position;

support means below the pin insertion means for supporting the board member as the board member is transported through the pin insertion station, the support means comprising a platen which is vertically adjustable relative to said fixed lower vertical position and means for vertically adjusting the platen;

pin height control and monitoring means operable:

(i) to press the board member downwardly towards the platen in the vicinity of each specific hole before and during operation of the pin insertion means on a pin insertion stroke with regard to that hole; and (ii) for monitoring the projecting height after insertion of each pin above the upper surface of the board member; and control means operable, when the monitoring means monitors a projecting pin height which varies from that desired, to controllably adjust the vertical position of the adjustable platen and thus of the board member and pin height control and monitoring means in an appropriate direction to render the projecting height of a succeeding inserted pin closer to that desired.

2. Apparatus according to claim 1 wherein the pin height control and monitoring means comprises a monitoring head disposed above the vertically adjustable platen and movable downwardly towards the platen and means for urging the monitoring head towards the platen to press the board member downwardly onto the platen.

3. Apparatus according to claim 2 wherein the pin height control and monitoring means comprises a light source and a light detector to be reflectively coupled to the source when an inserted pin moves out of the pin insertion station.

4. Apparatus according to claim 1 wherein the means for vertically adjusting the adjustable platen comprises a horizontally movable element disposed beneath the platen and means for translating degrees of horizontal movement of the element into smaller degrees of vertical movement of the platen.

5. Apparatus according to claim 4 wherein the movement translating means comprises a group of horizontally spaced apart rollers and a group of roller engaging surfaces which are inclined to the horizontal and are engaged by the rollers, one surface by each roller, one of the groups being provided upon the vertically adjustable platen and the other of the groups provided upon the horizontally movable element to produce relative movement of the rollers along the inclined surfaces for raising or lowering the vertically adjustable platen when the horizontally movable element is moved horizontally.

6. Apparatus according to claim 5 wherein the rollers are mounted upon the horizontally movable element and the roller engaging surfaces are provided upon the vertically adjustable platen.

7. Apparatus according to claim 4 further provided with a vertically fixed platen with a vertically movable platen overlying the fixed platen and the horizontally movable element disposed between the platens and supported upon the vertically fixed platen so as to allow for horizontal movement of the horizontally movable element.

8. A method of inserting pins into holes in a board member having a nominally planar upper surface comprising:

supporting the board member on a support surface while transporting the member through a pin insertion station;

as the board member is transported through the station, inserting pins into the holes in succession in the pin insertion station to positions in which the tops of the pins are in a fixed vertical position; and before and during insertion of each pin:

(i) applying a downward load onto the board member to press it onto the support surface in the vicinity of the corresponding hole to dispose the upper surface of the board member in the vicinity of each hole at substantially equal distances from the fixed vertical position during insertion of each pin;

(ii) monitoring the projecting height of certain inserted pins above the board upper surface after their insertion; and (iii) when a monitored height varies from that desired, controllably adjusting the height of the support surface so as to adjust the distance of the board upper surface around a succeeding hole from the fixed vertical position to make the inserted height of a succeeding pin closer to that desired.

9. A method according to claim 8 comprising monitoring the projecting height of each inserted pin as it is transported with the board member away from the pin insertion station and while maintaining the downward load onto the perforate member.

10. A method according to claim 9 comprising pressing a monitoring head downwardly against the upper surface of the board member to apply the downward load and while the monitoring head is pressed downwardly, inserting pins into holes in the board member, transporting the board member beneath the head and monitoring the projecting height of each pin as it is transported past the head.

11. A method according to claim 9 comprising monitoring the projecting height of each pin by transporting the pin past one light source and a corresponding light detector reflectively coupled to the source when the pin is at a certain minimum desired inserted height and another light source and corresponding light detector reflectively coupled to the source when the pin is above a certain maximum desired inserted height, and when the pin height is outside the desired limits, transmitting a signal to a control means to controllably adjust the height of the support surface.

12. A method according to claim 11 wherein the support surface is provided upon a vertically movable platen and controllably adjusting the height of the movable platen involves horizontally moving an element beneath the movable platen and translating the horizontal movement into a controlled vertical movement of the platen.

* * * * *